Figure 1:
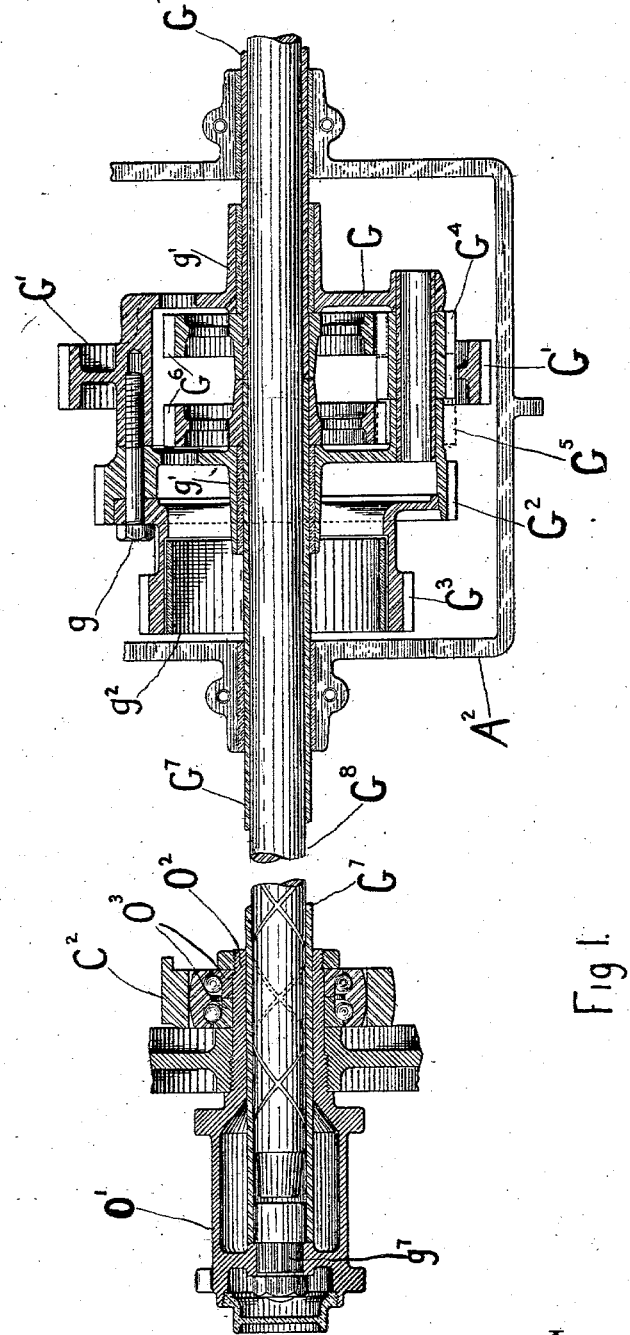

No. 758,147. PATENTED APR. 26, 1904.
H. M. POPE.
DRIVING MECHANISM.
APPLICATION FILED SEPT. 5, 1903.
NO MODEL.

Attest:
Rudolph Riege
A. I. Holcomb

Inventor:
Harry M. Pope,
by Hermann ...
his Attys.

No. 758,147. Patented April 26, 1904.

UNITED STATES PATENT OFFICE.

HARRY M. POPE, OF CHICOPEE FALLS, MASSACHUSETTS, ASSIGNOR TO ELECTRIC VEHICLE COMPANY, OF JERSEY CITY, NEW JERSEY, A CORPORATION OF NEW JERSEY.

DRIVING MECHANISM.

SPECIFICATION forming part of Letters Patent No. 758,147, dated April 26, 1904.

Original application filed October 26, 1899, Serial No. 734,816. Divided and this application filed September 5, 1903. Serial No. 172,087.

(No model.)

*To all whom it may concern:*

Be it known that I, HARRY M. POPE, a citizen of the United States, residing in the city of Chicopee Falls, county of Hampden, State of Massachusetts, have invented certain new and useful Improvements in Driving Mechanism, of which the following is a specification, reference being had to the accompanying drawing, forming a part hereof.

This invention relates to the driving mechanism of motor-vehicles, and particularly to the method of constructing, mounting, and transmitting of power to the driving-wheels and axle, the present application being a division of an application filed October 26, 1899, and serially numbered 734,816, for improvements in motor-vehicles.

In ordinary constructions a large amount of machining is necessary on both the hub and axle end; and it is the aim of this invention, primarily, to obviate as far as possible this double expense, while among other objects are simplifying and strengthening the two-part driving-shaft and its associate parts, as well as to obtain a more durable and in many ways advantageous construction.

As shown in the drawing, the hub of each driving-wheel is so constructed and arranged and so connected with the driving-shaft as to avoid the necessity of any threading or shouldering on the end of the latter. The hub O' of each driving-wheel is extended so as to project into the bearing $C^2$, which is carried by the vehicle-frame, the hub extension $O^2$ receiving the cones $O^3$ or other bearing parts. The tubular driving-shaft $G^7$ has at its end a key or a square or other polygonal plug or head $g^7$, which projects into the hub of the wheel and engages a similar polygonal opening, which may be formed conveniently at the outer end of the hub. Whether the driving shaft or axle be solid or tubular, it can thus be left perfectly plain, except for the polygonal head, and all of the threading and shouldering for the bearing parts are formed on the hub, which requires a great deal of machining in any event, and can therefore and in view of its smaller size be prepared for the bearing parts with much less expense and trouble than the shaft or axle, and it also thus becomes possible to use tube-stock without any machining, swaging, or other treatment which would increase the cost as well as weaken the driving member. While either solid or hollow driving-shaft member may be used, I prefer a tubular shaft member to transmit the driving power, as shown in the drawing. There it will be seen that two hollow shafts $G^7$ $G^7$, extending from each hub abut about the middle of the shaft $G^8$, being interconnected by the balance or equalizing gear. This latter is so constructed as to combine requisite strength and minimum wear with ease of assembling. The driving member G of the balance-gear is a frame or shell, which may be made in separate parts for convenience of manufacture, which parts may be secured together by bolts $g$, and is provided with two hub-bearings $g'$ and has secured to it or formed upon it the three gears $G'$ $G^2$ $G^3$, which are driven by any of the methods well known in the art. It is also provided with an expanding brake-band $g^2$, operated in the usual manner.

Intermeshing pinions $G^4$ and $G^5$ are carried by the driving member G and mesh, respectively, with two gears $G^6$ $G^6$, which are mounted concentrically with the said driving member, being secured each to the inner end of one of the sleeves $G^7$ or parts of the divided tubular axle or driven shaft, at the outer end of which is secured, preferably by the improved means herein described, the corresponding driving-wheel of the vehicle.

A stiffening-bar $G^8$ runs through the two sleeves or divided tubular axle from wheel center to wheel center and, as shown, is the only member extending from side to side of the vehicle through the frame or running-gear supporting bracket-bearings, and therefore alone carries the weight of the driving mechanism, thus giving the advantages of a practically solid axle combined with those of the divided axle.

In ordinary divided-axle constructions it is very difficult and often quite impossible to insure perfect alinement of the parts after use, the weight and points of support being necessarily such as to cause bending of the axle at the point of division. It will be readily seen the construction herein described overcomes these difficulties, the stiffener-bar $G^8$ carrying all the weight, while the tubular axle $G^7$ transmits the driving power only, and its two parts, with their associate mechanism, are thus kept in perfect alinement.

Various modifications of the general form of construction herein shown and described will readily suggest themselves, and it is therefore to be understood that this invention is not limited to the precise arrangement shown or specifically described.

I claim as my invention—

1. In a motor-vehicle, the combination of a support having a bearing, a driving-wheel having its hub projected into the bearing with the bearing parts thereon, and a driving shaft or axle projected into the hub and having its end formed to engage a similar opening in the hub, substantially as shown and described.

2. In a motor-vehicle, the combination with a support having bearings and a driving mechanism, of driving-wheels each having its hub projected into the corresponding bearing with the bearing parts thereon, a tubular driving-shaft having its ends formed to engage said driving-wheels, and a supporting or stiffening bar extended from side to side of the vehicle through said tubular shaft and through the bearings and wholly supporting the driving mechanism, substantially as shown and described.

3. In a driving mechanism for vehicles, a driving-shaft comprising an inner stiffener-bar extending from one side bearing to the other, a tubular two-part driving member inclosing said stiffener-bar, and a balance-gear connecting the adjoining ends of said tubular shafts, and a plurality of gears of different sizes mounted directly upon said balance-gear casing.

This specification signed and witnessed this 2d day of September, A. D. 1903.

HARRY M. POPE.

In presence of—
F. C. Ross,
Hermann F. Cuntz.